United States Patent [19]

Elvin

[11] Patent Number: 4,787,968

[45] Date of Patent: Nov. 29, 1988

[54] CATALYST DEMETALLIZATION AND PROCESS FOR USING DEMETALLIZED CATALYST

[75] Inventor: Frank J. Elvin, Kenner, La.

[73] Assignee: ChemCat Corporation, New Orleans, La.

[21] Appl. No.: 66,971

[22] Filed: Jun. 29, 1987

Related U.S. Application Data

[62] Division of Ser. No. 881,334, Jul. 2, 1986, Pat. No. 4,686,197.

[51] Int. Cl.$^4$ .............................................. C10G 11/05
[52] U.S. Cl. ............................ 208/120; 208/52 CT; 208/113; 502/32; 502/516
[58] Field of Search ................ 208/120, 113, 52 CT; 502/22, 32, 34, 35, 521, 516, 41

[56] References Cited

U.S. PATENT DOCUMENTS

| | | | |
|---|---|---|---|
| 3,151,088 | 9/1964 | Sanford et al. | 502/35 |
| 3,168,461 | 2/1965 | Russell et al. | 502/35 |
| 3,182,025 | 5/1965 | Simantel et al. | 502/35 |
| 3,234,145 | 2/1966 | Foster | 502/35 |
| 3,252,918 | 5/1966 | Disegna et al. | 502/35 |
| 3,527,715 | 9/1970 | Giannetti et al. | 502/35 |
| 4,424,111 | 1/1984 | Zielke et al. | 208/108 |
| 4,473,657 | 9/1984 | Tse et al. | 502/37 |
| 4,686,197 | 8/1987 | Elvin | 208/52 CT |

*Primary Examiner*—Anthony McFarlane
*Attorney, Agent, or Firm*—Frank J. Uxa

[57] ABSTRACT

An improved catalyst demetallization process involves chlorinating the metal contaminated catalyst at elevated temperatures and contacting the chlorinated catalyst with a liquid aqueous composition to produce a demetallized catalyst. Improved catalytic activity is obtained utilizing a catalyst comprising at least one crystalline material capable of promoting the hydrocarbon conversion, and cooling the chlorinated catalyst prior to contact with the liquid aqueous composition. An improved hydrocarbon conversion process is also disclosed.

11 Claims, No Drawings

4,787,968

CATALYST DEMETALLIZATION AND PROCESS FOR USING DEMETALLIZED CATALYST

This application is a division of application ser. No. 881,334, filed July 2, 1986, now U.S. Pat. No. 4,686,197.

The present invention relates to improved demetallization of catalyst which is contaminated by one or more metals in hydrocarbon conversion service. More particularly, the invention relates to such an improved catalyst demetallization process which involves at least partially chlorinating the catalyst.

Catalytically promoted processes for the chemical conversion of hydrocarbons include cracking, hydrocracking, reforming, hydrodenitrogenation, hydrodesulfurization, etc. Such reactions generally are performed at elevated temperatures, for example, about 300 degrees F. to 1200 degrees F., more often about 600 degrees F. to about 1000 degrees F. Feedstocks to these processes comprise normally liquid and solid hydrocarbons which, at the temperature of the conversion reaction, are generally in the fluid, i.e., liquid or vapor state, and the products of the conversion usually are more valuable, lower boiling materials.

In particular, cracking of hydrocarbon feedstocks to produce hydrocarbons of preferred octane rating boiling in the gasoline range is widely practiced and uses a variety of solid catalysts comprising at least one of certain synthetic crystalline materials to give more valuable end products. Cracking is ordinarily effected to produce gasoline as the most valuable product and is generally conducted at temperatures of about 750 degrees F. to about 1100 degrees F., preferably about 850 degrees F. to about 950 degrees F., at pressures up to about 2000 psig., preferably about atmospheric to about 100 psig. and without substantial addition of free hydrogen to the system. In cracking, the feedstock is usually a petroleum hydrocarbon fraction such as straight run or recycle oils or other normally liquid hydrocarbons boiling above the gasoline range.

The present invention relates to the improvement of catalyst performance in hydrocarbon conversion where metal poisoning occurs. Although referred to as "metals", these catalyst contaminants may be present in the hydrocarbon feed in the form of free metals or relatively non-volatile metal compounds. It is, therefore, to be understood that the term "metal" as used herein refers to either form. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present in petroleum stocks, including some iron, petroleum stocks also have a tendency to pick up tramp iron from transportation, storage and processing equipment. Most of these metals, when present in a stock, deposit in a relatively non-volatile form on the catalyst during the conversion processes so that regeneration of the catalyst to remove deposited coke does not also remove these contaminants.

Typical crudes which are contaminated with metals and some average amounts of metal are: North slope, 11 ppm nickel, 33 ppm vanadium; Lagomedio (Venezuelan), 12 ppm nickel, 116 vanadium; light Iranian, 16 ppm nickel, 44 ppm vanadium; heavy Iranian, 30 ppm nickel, 22 ppm vanadium. In general, a crude oil can contain from about 5 to 500 ppm nickel and from about 5 to 1500 ppm vanadium. Moreover, since the metals tend to remain behind during processing, the bottoms of typical feeds will have an amount of metals two, three, four times or more than the original crude. For example, reduced crude or residual stocks can have vanadium levels as high as 1000-2000 ppm. Typical residual stocks and their vanadium level include: Sag River atmospheric residuum, 48 ppm vanadium; heavy Iranian atmospheric residuum, 289 ppm vanadium; Canadian tar sand bitumen, 299 ppm vanadium; Tia Juana Vacuum residuum, 570 ppm vanadium; and Orinoco Heavy Crude, 1200 ppm vanadium. The higher the metal level in the feed, the more quickly a given catalyst will be poisoned and consequently the more often or more effective the demetallization of that catalyst must be.

Of the various metals which are to be found in representative hydrocarbon feedstocks some, like the alkali metals, only deactivate the catalyst without changing the product distribution; therefore, they might be considered true poisons. others such as iron, nickel, vanadium and copper markedly alter the selectivity and activity of cracking reactions if allowed to accumulate on the catalyst and, since they affect process performance, are also referred to as "poisons". A poisoned catalyst with these metals generally produces a higher yield of coke and hydrogen at the expense of desired products, such as gasoline and butanes. For instance, U.S. Pat. No. 3,147,228 reports that it has been shown that the yield of butanes, butylenes and gasoline, based on converting 60 volume percent of cracking feed to lighter materials and coke dropped from 58.5 to 49.6 volume percent when the amount of nickel on the catalyst increased from 55 ppm to 645 ppm and the amount of vanadium increased from 145 ppm to 1480 ppm in a fluid catalytic cracking of a feedstock containing some metal contaminated stocks. Since many cracking units are limited by coke burning or gas handling facilities, increased coke or gas yields require a reduction in conversion or throughput to stay within the unit capacity.

Many patents have issued discussing various approaches to removing metals from hydrocarbon conversion catalysts and then returning the catalyst to hydrocarbon conversion service. Certain of these patents involved chlorinating metal contaminated alumina, silica-alumina and silica catalysts at elevated temperatures. See, for example, U.S. Pat. Nos. 3,150,104; 3,122,510; 3,219,586; and 3,182,025. In each of these patents, the chlorinated catalyst is preferably cooled prior to contact with a liquid aqueous wash to avoid the use of excessive pressures to maintain the liquid phase. These patents do not disclose that such cooling affects the catalytic activity of such oxide-based catalysts. In certain instances, prior patents have taught the use of liquid aqueous compositions containing ammonium ion to at least partially neutralize the chlorine and/or hydrogen chloride which exists with the chlorinated catalyst.

In the more recent past, other demetallization processes have been suggested which do not primarily involve chlorinating of the catalyst. See, for example, U.S. Pat. Nos. 4,101,444; 4,163,709; 4,163,710; 4,243,550 and related patents. These newer processes seek to effectively demetallize the newer, zeolite-containing catalysts while eliminating the use and handling of chlorinating agents and chlorinated catalyst which are often corrosive, particularly at elevated temperatures. These relatively less severe demetallization processes were also thought to be less likely to detrimentally affect the relatively fragile zeolite-containing catalysts. However, these "non-chlorinating" processes have been found in a number of situations to be not as effective in catalyst demetallization as processing schemes involving catalyst chlorination. However, because of the corrosion and catalyst, particularly zeolite-containing catalyst, destruction problems perceived to exist, catalyst chlorination as a demetallization technique has received less and less consideration for commercialization. Clearly, it would be advantageous to provide an improved catalyst demetallization process involving catalyst chlorination.

Therefore, one object of the present invention is to provide an improved process for demetallizing a metal contaminated, hydrocarbon conversion catalyst.

Another object of the present invention is to provide an improved hydrocarbon conversion process utilizing as at least a portion of the catalyst a demetallized catalyst. Other objects and advantages of the present invention will become apparent hereinafter.

An improved process for demetallizing a catalyst contaminated with at least one contaminant metal while promoting hydrocarbon conversion of a feedstock containing the contaminant metal or metals has been discovered. The process includes the steps of contacting the catalyst at elevated temperature with at least one chlorine-containing component to form a chlorinated catalyst and contacting the chlorinated catalyst with at least one liquid aqueous composition to produce a demetallized catalyst having a reduced content of the contaminant metal or metals. In one broad aspect, the present improvement comprises utilizing a catalyst comprising at least one synthetic crystalline material, i.e., zeolite, capable of promoting the hydrocarbon conversion; and cooling the chlorinated catalyst prior to the first contacting of the chlorinated catalyst with the liquid aqueous composition, thereby forming a demetallized catalyst with improved hydrocarbon conversion catalytic activity, relative to a demetallized catalyst formed without such cooling. In another broad embodiment, the present improvement comprises utilizing a catalyst comprisng at least one zeolite capable of promoting the hydrocarbon conversion and contacting the chlorinated catalyst with a liquid composition substantially free of ammonium ions, thereby forming a demetallized catalyst with improved hydrocarbon conversion catalytic activity, relative to a demetallized catalyst first contacted with an ammonium ion-containing liquid aqueous compositon.

The present invention provides substantial and surprising benefits. By properly choosing the chlorinated catalyst temperature and/or chemical make-up of the first liquid aqueous composition to contact the chlorinated catalyst, a demetallized catalyst having surprisingly improved catalytic activity is obtained. Not only is the catalyst effectively demetallized, chlorine-related corrosion reduced and/or ammonia or ammonium salt cost eliminated, the catalytic activity of synthetic crystalline material-containing hydrocarbon conversion catalysts is actually increased by practicing the present improved demetallization processes.

In another embodiment, the invention is directed to a hydrocarbon conversion process employing a catalyst to promote the conversion of a substantially hydrocarbon feedstock. In this embodiment, the present improvement comprises at least one, preferably both, of the following: (1) subjecting at least a portion of the catalyst to the present demetallization process; and (2) employing the demetallized catalyst from the present demetallization process as at least a portion of the catalyst in the hydrocarbon conversion process.

The presently useful cooling step may be performed in any suitable manner and in any suitable equipment. It is preferred that the chlorinated catalyst be kept substantially anhydrous during this cooling. In one embodiment, the cooling occurs by contacting the relatively high temperature chlorinated catalyst with a lower temperature gaseous composition, preferably a substantially inert gaseous composition such as nitrogen, combustion flue gases, carbon dioxide, argon, the other inert gases and the like. In addition to providing for at least a portion of the cooling to the chlorinated catalyst, this gaseous composition contacting preferably acts to reduce the chlorine (or chloride) content of the chlorinated catalyst and/or reduces the content of at least one of the contaminant metals, in particular vanadium, from the chlorinated catalyst, e.g., by "sweeping" away volatile metal chlorides which are formed during catalyst chlorination. It should be noted that the gaseous composition/chlorinated catalyst contacting may occur to provide for one or both of reducing chlorine content and/or metal content without providing at least a portion of the cooling. Thus, for example, the purging gas or gases may be contacted with the chlorinated catalyst, e.g., in the chlorinating reaction zone, at or about substantially the same temperature, or higher, at which the chlorination occurred. Reducing the chlorine content during such purging gas contacting is preferred since the pH of the first mixture of catalyst/liquid aqueous composition is less acid and harmful dissolution of alumina, if present in the catalyst is inhibited.

The cooling may occur in a separate heat exchanger, e.g., conventional catalyst cooler, in which heat from the chlorinated catalyst is indirectly provided to a cooling medium, such as a liquid or gaseous medium. It is preferred that the hot chlorinated catalyst not contact any liquid medium prior to being cooled as described herein. The degree of cooling may vary widely, provided that such cooling provides a demetallized catalyst with improved hydrocarbon conversion catalytic activity. Preferably, this cooling reduces the temperature of the chlorinated catalyst by at least about 50 degrees F. In one particular embodiment, the cooling reduces the temperature of the chlorinated catalyst to a temperature in the range of about 50 degrees F. to about 250 degrees F., more preferably about 60 degrees F. to about 150 degrees F.

The composition of the hydrocarbon conversion catalysts useful in the present invention may vary widely provided that the catalyst contains at least one synthetic crystalline material in an amount effective to promote the desired hydrocarbon conversion at hydrocarbon conversion condition. Materials known as zeolites or molecular sieves are one preferred class of synthetic crystalline materials. Useful zeolites include not only synthetic zeolites, but also naturally occurring zeolites the chemical make-up of which is modified or changed to enhance one or more of the catalytic properties of the naturally occurring zeolite.

When the desired hydrocarbon conversion involves one or more of hydrocarbon cracking (preferably in the substantial absence of added free molecular hydrogen), disproportionation, isomerization, hydrocracking, reforming, dehydrocyclization, polymerization, alkylation and dealkylation, synthetic crystalline materials aluminosilicates, SAPO. TAPO. MeAPO, AlPO, ZSM-series, LZ-Z10, LZ-10, USY and the like. Certain of these synthetic crystalline materials are discussed in U.S. Pat. Nos. 4,310,440; 4,440,871; 4,500,651; and 4,503,023, the specification of each of which patents is incorporated by reference herein. Of these, catalysts which include a catalytically effective amount of USY are particularly preferred.

Compositions of the catalysts which are particularly useful in the present invention are those in which the synthetic crystalline materials is incorporated in an amount effective to promote the desired hydrocarbon conversion, e.g., a catalytically effective amount, into a porous matrix which comprises, for example, amorphous material which may or may not be itself capable of promoting such hydrocarbon conversion. Included among such matrix materials are clays and amorphous compositions of alumina, silica, silica-alumina, magnesia, zirconia, mixtures of these and the like. The synthetic crystalline material is preferably incorporated into the matrix material in amounts within the range of about 1% to about 75%, more preferably about 2% to about 50%, by weight of the total catalyst. The preparation of crystalline-amorphous matrix catalytic materials is described in U.S. Pat. Nos. 3,140,253 and RE. 27,639. Catalytically active synthetic crystalline materials which are formed during and/or as part of the methods of manufacturing the catalyst are within the scope of the present invention.

The catalysts useful in the catalytic hydrocarbon cracking embodiment of the present invention may be any conventional catalyst capable of promoting hydrocarbon cracking at the conditions present in the reaction zone, i.e., hydrocarbon cracking conditions and containing at least one of the above-noted synthetic crystalline materials. Similarly, the catalytic activity of such solid particles is restored at the conditions present in a conventional cracking unit regeneration zone. Typical among these conventional catalysts are those which comprise alumina, silica and/or silica-alumina and at least one synthetic crystalline material, e.g., aluminosilicate, having pore diameters of about 8 angstroms to about 15 angstroms and mixtures thereof. When the catalysts to be used in the hydrocarbon cracking embodiment of the present invention contain crystalline aluminosilicate, the crystalline aluminosilicate may include minor amounts of conventional metal promoters such as the rare earth metals, in particular cerium.

This invention makes use of chlorination, preferably vapor phase chlorination, at moderately elevated temperatures up to about 700 degrees F. or even up to about 900 degrees F. or 1000 degrees F., wherein the catalyst composition and structure is not materially harmed by the treatment and a substantial amount, preferably at least about 30% and more preferably at least about 50%, of the poisoning metals content is converted to chlorides. The chlorination preferably takes place at a temperature of at least about 300 degrees F., more preferably about 550 degrees to 650 degrees F. The chlorination, even when conducted in the lower temperature ranges, e.g., below about 550 degrees F., preferably serves simultaneously to remove, by volatilization, vanadium chlorides such as vanadium oxychloride and/or vanadium tetrachloride and/or iron chloride formed by chlorination. When volatilization of these compounds is not performed or not completed during chlorination, the chlorination may be followed by a purge with an inert gas such as nitrogen or flue gas in these higher temperature ranges, that is, about 550 degrees F. to about 700 degrees F. or about 1000 degrees F. for volatilization of these compounds.

The chlorinating agent or mixture is preferably substantially anhydrous, that is, if changed to the liquid state no separate aqueous phase would be observed. As the amount of water in the chlorinating agent increases, additional time and/or chlorinating agent may be required to obtain a given amount of metal removal. This inhibiting effect is also evident when water is present in the catalyst so that it is preferred that the catalyst contain less than about 1% or about 2% volatile matter, that is, matter which is removable by heating to 1000 degrees C. A pressure of about 0 to about 100 or more psig., preferably about 0 to about 15 psig. may be maintained during chlorination, the contacting usually lasting for at least about five minutes, preferably about 15 minutes to about 2 hours, but shorter or longer reaction periods may be possible or needed.

The chlorinating mixture preferably contains a chlorinating agent and a gaseous inert diluent. The chlorinating agent may be a vaporizable covalent compound of chlorine with carbon or sulfur. The carbon compounds of chlorine which may be employed are generally the chlorine-substituted light hydrocarbons which may be introduced to the chlorination reactor as such or may be produced during the chlorination from a mixture of a chlorine gas with low molecular weight hydrocarbons. Preferably the carbon compound of chlorine employed is carbon tetrachloride. Useful inorganic sulfur-containing compounds include the volatizable sulfur chlorides, viz. sulfur monochloride, $S_2Cl_2$, sulfur dichloride, $SCl_2$, thionyl chloride, $SOCl_2$, and sulfuryl chloride, $SO_2Cl_2$.

The gaseous inert diluent, the other component of one preferred chlorinating mixture, may advantageously be nitrogen or any other gas inert under the reaction conditions. However, it is preferable to avoid the use of inert gases containing hydrocarbons, even in small amounts. It has been found that the addition of a diluent such as nitrogen may be effective in reducing the amount of the chlorinating agent used for effective conversion of, for instance, vanadium to its volatile chlorides.

It has also been found that a chlorinating gas comprising molecular chlorine, hydrogen chloride and mixtures thereof, particularly in combination with one or more of the covalent chlorinating agents described above, may advantageously be employed as at least part of the chlorinating agent. The covalent chlorinating agent may be provided in lesser amounts when molecular chlorine or HCl is present, while still resulting in substantial effective conversion of contaminating metals to their chlorides at the moderate temperatures of the process. Molecular chlorine and HCl are considerably less expensive than, say, carbon tetrachloride or other agents and thus a combination of the agent and molecular chlorine or HCl is economically attractive.

If employed, the vaporizable covalent carbon or sulfur compounds of chlorine are generally used in the amount of about 0.5–50 percent, preferably 1–10 percent, based on the weight of the catalyst, for good metals removal. The amount of the agent may vary, however, depending upon the manipulative aspects of the chlorination step, for example, a batch treatment may sometimes require more agent than a continuous treatment for the same degree of effectiveness and results.

When molecular chlorine or HCl are employed as at least part of the chlorinating agent they are supplied in amounts preferably in the range of about 0.5% to about 150%, more preferably about 2% to about 35% based on the weight of the catalyst. The gaseous inert diluent advantageously is used in amounts of about 1% to about 25%, more preferably about 2% to about 15%, based on the weight of the catalyst treated.

The process of this invention produces significantly greater removal of vanadium when, upon removal of the vanadium-poisoned catalyst from the hydrocarbon conversion reactor, it is regenerated and given a treatment at elevated temperatures with molecular oxygen-containing gas before chlorination.

Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 degrees F. to about 1400 degrees F., more usually about 1000 degrees F. to about 1350 degrees F. Combustion of coke from the catalyst is rapid, and for reasons of economy only enough air is used to supply the needed oxygen. Average residence time for a portion of catalyst in the regenerator may be on the order of about a few minutes, e.g., about 5 minutes to about 10 minutes, and the oxygen content of the effluent gases from the regenerator is desirably less than about ½% by volume. When later oxygen treatment is employed in this invention, the regeneration of the catalyst is generally regulated to give a carbon content of less than about 0.5% by weight.

Treatment of the regenerated catalyst with molecular oxygen-containing gas to increase vanadium removal is preferably conducted at temperatures preferably above the temperature present in the catalyst regeneration zone, more preferably in the range of about 1000 degrees to 1800 degrees F. but below a temperature where the catalyst undergoes any substantial deleterious change in its physical or chemical characteristics. The catalyst is preferably in a substantially carbon-free condition during this high temperature treatment. If any significant amount of carbon is present in the catalyst at the start of this high-temperature treatment, the oxygen contact is preferably that continued after carbon removal. In any event, after carbon removal, the oxygen treatment of the essentially carbon-free catalyst is preferably at least long enough to provide a substantial amount of vanadium in its highest valence state.

The treatment of the catalyst with molecular oxygen-containing gas prior to the chlorination is preferably performed at a temperature at least about 50 degress F. higher than the regeneration temperature. The duration of the oxygen treatment and the amount of vanadium prepared by the treatment for subsequent removal is dependent, for example, upon the temeperature and the characteristics of the equipment used. The length of the oxygen treatment preferably is in the range of about a quarter of an hour to about four hours or more. The oxygen-containing gas used in the treatment preferably contains molecular oxygen and there is little significant consumption of oxygen in this treatment. The gas may be oxygen, or a mixture of oxygen with inert gas, such as air or oxygen-enriched air. The partial pressure of oxygen in the treating gas may range widely, for example, from about 0.1 to 30 atmospheres. The factors of time, partial pressure and extent of vanadium stabilization may be chosen with a view to the most economically feasible set of conditions. It is preferred to continue the oxygen treatment for at least about 15 or 30 minutes with a gas containing at least about 1% by volume, preferably at least about 10% by volume oxygen.

The chlorination method of the invention is of value, not only in the removal of vanadium from the catalyst, but also in putting nickel poisons into a form solution in an aqueous composition. Also the chlorinating method may be used as a supplement, primarily for vanadium removal, to a complete processing scheme for nickel removal in which clorination does not play a significant part. For example, sulfiding of the poisoned catalyst has been found to be advantageous for nickel and perhaps vanadium contaminant removal by subsequent chlorination and water washing or by other subsequent treatments which put nickel into a dispersible form, or which dissolve or disperse nickel directly from the sulfided catalyst.

The sulfiding step can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 degrees F. to about 1500 degress F., preferably about 800 degress F. to about 1300 degrees F. Other treating conditions can include a sulfur-containing vapor partial pressure of about 0.1 to about 30 atmospheres or more, preferably about 0.5 to about 25 atmospheres. Hydrogen sulfide is a preferred sulfiding agent. Pressures below atmospheric can be obtained either by using a partial vacuum or by diluting the vapor with gas such as nitrogen of hydrogen. The time of contact may vary on the basis of the temperature and pressure chosen and other factors such as the amount of metal to be removed. The sulfiding may run, for instance, at least about 5 or 10 minutes up to about 20 hours or more depending on the sulfiding conditions and the severity of the catalyst poisoning. Temperatures of about 900 degrees F. to about 1200 degress F. and pressures approximating 1 atmosphere or less are preferred for sulfiding and this treatment often continues for at least about 1 to 2 hours but the time, of course, can depend upon the manner of contacting the catalyst and sulfiding agent and the nature of the treating system, e.g., batch or continuous, as well as the rate of diffusion within the catalyst. The sulfiding step performs the function not only of supplying a sulfur-containing metal compound which may be easily converted to chloride form but also appears to concentrate some metal poisons, especially nickel, at the surface of the catalyst particle.

After chlorination and preferably after at least partial vaporization of vanadium chlorides, and after the chlorinated catalyst is cooled, as described, the catalyst is washed in a liquid aqueous composition, preferably substantially free of ammonium ions, to remove at least a portion of the contaminant metal, for instance nickel chlorides.

The water used is sometimes distilled or deionized prior to contact with the chlorinated catalyst. However, the aqueous medium can contain extraneous ingredients in trace amounts, so long as the medium is aqueous-based and the extraneous ingredients do not interfere with demetallization or adversely affect the properties of the catalyst. Temperatures of about 150 degrees F. to the boiling point of water are helpful in increasing the solubility of the metal chlorides. Temperatures above 212 degress. F. and elevated pressures may be used but the results do not seem to justify the added equipment. The aqueous liquid is preferably acid and a weakly acid condition may be obtained by the chlorides generally present in a chlorinated catalyst which has not been purged too severely.

The initial liquid aqueous composition may be a reductive wash medium, which is preferably followed by an oxidative wash. These washes my be given alternately or several reductive washes may be followed by several oxidative washes. When alternating washes are used, the final wash is preferably an oxidative wash to leave the catalyst in the best form for hydrocarbon conversion, e.g., cracking. As used herein, "reductive" wash refers to a wash with an aqueous solution containing a reducing agent or an agent which may give up electrons. similarly, "oxidative" wash refers to a wash with an aqueous solution containing an oxidizing agent or an agent which may accept electrons. Moreover, "wash" refers to a treatment with the solution which may be accomplished by contacting the catalyst with the wash solution for a time sufficient to cause an interaction between the solution and catalyst thereby removing at least a portion of the metal poison. The contacting may be a batch operation, a semi-continuous operation or a continuous operation. Thus, a "wash" may include merely stirring in a batch vessel or a complex series of counter current contactors or continuous contactors.

A preferred reductive wash medium comprises a solution of sulfur dioxide or compounds capable of producing sulfur dioxide such as sulfides and bisulfites in an acidic aqueous medium. Other reducing agents which may be used include hydrogen, carbon monoxide, hydrogen sulfide oxalic acid or salts thereof, hydrazine and hydrazine derivatives, borane, diborane, borohydrides, metallic aluminum hydrides, sulfites, thiosulfites, dithionites, poly-thionites and the like. A reductive wash with one or more of the preferred reducing agents do not require a subsequent oxidative wash. The preferred reducing agents include, in addition to sulfur dioxide, hydrogen, carbon monoxide, hydrogen sulfide, hydrazine, and hydrazine derivatives, borane, diborane, borohydrides, metallic aluminum hydrides, sulfites, thiosulfites, dithionites, hydrothionites, polythionites and mixtures thereof. Sulfur dioxide is particularly preferred since it provides sufficient temporary acidity without risking substantial alumina removal from the catalyst, it provides sufficient reducing power and it produces stable anions containing sulfur and oxygen to keep the removed metals in a soluble form. Reductive washes with sulfur dioxide are preferably effected at conditions to inhibit oxidation of the $SO_2$, e.g., in the absence of oxygen, thereby rendering an oxidative system instead of the desired reductive system. By way of example of a preferred reductive wash, an aqueous solution saturated with sulfur dioxide to form a sulfur oxide hydrate (i.e., $SO_2.xH_2O$) is prepared at about 0 degrees C. to about 20 degrees C. preferably about 5 degrees C. to about 15 degrees C., by bubbling $SO_2$ through water. An aqueous e.g., about 10–%40% and preferably about 15–25% by weight, catalyst slurry in water is prepared and heated to a temperature of about 60 degrees C. to about 95 degrees C., preferably about 65 degrees C. to about 80 degrees C. The $SO_2$ saturated solution is then added to the catalyst slurry in an amount sufficient to give an initial pH of the system in the range of about 2.0 to about 3.5 and preferably about 2.5 to about 3.0. Preferably, about 0.1 to about 10 volumes of $SO_2$ saturated solution per volume of catalyst are used during the wash. After the contacting has occurred for about 0.5-10 minutes, preferably about 1-5 minutes, preferably under an inert atmosphere, the demetallized catalyst can be separated, e.g., by filtration or decanting. Long contact times, i.e., in excess of about 10 minutes, are preferably avoided to minimize metals redisposition on the catalyst and to avoid oxidation of the $SO_2$ should the wash be effected in a manner where air and oxygen are not intentionally excluded. This reductive wash step can be followed by a water wash.

As indicated, the reductive wash preferably is followed by an oxidative wash. A preferred oxidative wash medium comprises a solution of hydrogen peroxide in water. Other oxidizing agents which may be used include air, oxygen, ozone, perchlorates, organic hydroperoxides, organic peroxides, organic peracids, inorganic peroxyacids such as peroxymonosulfuric and peroxydisulfuric acid, singlet oxygen, $NO_2$, $N_2O_4$, $N_2O_3$, superoxides and the like. Typical examples of organic oxidants are hydroxlheptyl peroxides, cyclohexanone peroxide, tertiary butyl peracetate, di-tertiary butyl diperphthalate, tertiary butyl perbenzoate, methyl ethyl ketone peroxide, dicumyl peroxide, tertiary butyl hydroperoxide, di-tertiary butyl peroxide, p-methyl benzene hydroperoxide, pinane hydroperoxide, 2,5-dimethylhexane-2, 5-dihydroperoxide, cumene hydroperoxide and the like; as well as organic peracids such as performic acid, peracetic acid, trichlorperacetic acid, perchloric acid, periodic acid, perbenzoic acid, perphthalic acid and the like including salts thereof. Ambient oxidative wash temperatures can be used, but temperatures of about 150 degrees F. to the boiling point of the aqueous solution in combination with agitation are helpful in increasing dispersibility or removability of the metal poisons. Preferred temperatures are about 65 degrees to about 95 degrees C. Pressure above atmospheric may be used but the results usually do not justify the additional equipment. Contact times similar to the contact times for the reductive wash such as from about several seconds to about half an hour are usually sufficient for poisoning metal removal.

As indicated, preferably the $SO_2$ reductive wash is followed by a hydrogen peroxide-water oxidative wash. The hydrogen peroxide solution preferably containing about 2 to 30 weight % hydrogen peroxide, can be added to an aqueous catalyst slurry as described earlier at about 65 degrees C. to about 95 degrees C., preferably 60 degrees C. to about 85 degrees C. and allowed to react for a time sufficient to solubilize at last a portion of the vanadium. Preferred wash times are about 1-5 minutes. A concentration of $H_2O_2$ in the range of about 5-50 lb., preferably about 10-20 lb. of $H_2O_2$/ton of catalyst is preferably used. Additional oxidative washes can be used to ensure efficient removal of metal and the restoration of catalytic properties. In addition, the oxidative washing can be carried out either in the presence of or absence of a mineral acid such as HCl, $HNO_3$ of $H_2SO_4$. Preferably, the pH of the oxidative wash medium is about 2 to about 6. Alternating catalyst washing using reductive and oxidative solutions can be used. If alternative washes are used, it is preferred that the last wash be an oxidative wash.

After the catalyst is washed, the catalyst slurry can be filtered to give a cake. The cake may be reslurried one or more times with water or rinsed in other ways, such as, for example, by a water wash of the filter cake.

After the washing and rinsing treatment which may be used in the catalyst demetallization procedure, the catalyst is transferred to a hydrocarbon conversion system, for instance, to a catalyst regenerator. The catalyst may be returned as a slurry in the final aqueous wash medium, or it may be desirable first to dry the catalyst filter cake or filter cake slurry at, for example, about 215 degrees F. to about 320 degrees F., under a vacuum. Also, prior to reusing the catalyst in the conversion operation it can be calcined, for example, at temperatures usually in the range of about 700 degrees F. to about 1300 degrees F. Preferably, the demetallized catalyst is not calcined at a temperature higher than the temperature present during catalyst regeneration, e.g., in the catalyst regeneration zone, prior to rinsing the catalyst in the hycrocarbon conversion operation. Such high temperature calcination has been found to reduce the catalytic effectiveness of the demetallized catalyst. The catalyst may be slurried with hydrocarbons and added back to the reactor vessel, if desired.

If desired, additional metals removal may be obtained by repeating the demetallization sequence or using other known treatment processes. Inert gases frequently may be employed after contact with reactive vapors to remove any of these vapors entrained in the catalyst or to purge the catalyst of reaction products.

The catalyst to be treated may be removed from the hydrocarbon conversion system—that is, the stream of catalyst which, in most conventional procedures, is cycled between conversion and regenerating operations—before the poison content reaches about 100,000 ppm., the poisoning metals, e.g., nickel, vanadium, iron, copper and mixtures thereof, being calculated as elemental metals.

The amount of nickel, vanadium, iron and/or copper removed in practicing the procedures outlined or the proportions of each may be varied by proper choice of treating conditions. It may prove necessary, in the case of very severely poisoned catalyst, to repeat the treatment to reduce the metals to an acceptable level, perhaps with variations when one metal is greatly in excess. A further significant advantage of the process lies in the fact that the overall metals removal operation, even if repeated, does not unduly deleteriously affect the activity, selectivity, pore structure and other desirable characteristics of the catalyst. Any given step in the demetallization treatment is usually continued for a time sufficient to effect a meaningful conversion or removal of poisoning metal and ultimately results in a substantial increase in metals removal compared with that which would have been removed if the particular step had not been performed. Preferably, the present catalyst demetallization process will provide greater than about a 50 weight % reduction in nickel, about 50 weight % reduction in vanadium and about 30 weight % reduction in iron. Such processing preferably provides about 70-90 weight % reduction in nickel, about 50-80 weight % reduction in vanadium and about 30-75 weight % reduction in iron when the catalyst initially contains as much as about 0.1 to 0.5 weight % nickel, about 0.3 to 1.0 weight % vanadium and about 0.2 to 1.2 weight % of iron.

In this invention the substantially hydrocarbon oils utilized as feedstock for a given conversion process may be of any desired type normally utilized in such hydrocarbon conversion operations. The feedstock may contain nickel, iron and/or vanadium as well as other metals. The catalyst may be used to promote the desired hydrocarbon conversion by employing at least one fixed bed, moving bed or fluidized bed (dense or dilute phase) of such catalyst. Bottoms from hydrocarbon processes, (i.e., reduced crude and residuum stocks) are particularly highly contaminated with these metals and therefore rapidly poison catalysts used in converting bottoms to more valuable products. For example, a bottom may contain about 100-1500 ppm Ni, about 100-2500 ppm V and about 100-3000 ppm Fe. For typical operations, the catalytic cracking of the substantially hydrocarbon feed would often result in a conversion of about 10 to 80% by volume of the feedstock into lower boiling, more valuable products.

The present invention is particularly suitable for demetallizing catalysts utilized in the catalytic cracking of reduced or topped crude oils to more valuable products such as illustrated in U.S. Pat. Nos. 3,092,568 and 3,164,542. The teachings of which are incorporated by reference herein. Similarly, this invention is applicable to processing shale oils, tar sands oil, coal oils and the like where metal contamination of the processing, e.g., cracking catalyst, can occur.

The following non-limiting examples illustrate certain aspects of the present invention.

EXAMPLES 1 TO 3

A mass of commercial equbrium fluid catalytic cracking catalyst was obtained for testing. This catalyst was originally manufactured by Filtrol and contained a catalytically effective amount of USY synthetic zeolite. The catalyst had been used in a commerical fluid bed catalytic cracking operation and included amounts of vanadium, iron and nickel from the catalytic cracking hydrocarbon feedstock which became associated with the catalyst when the catalyst was in the cracking reaction zone.

A portion of this catalyst was subjected to the following procedure.

A two inch i.d. by eighteen inch long quartz vessel fitted with a coarse quartz frit was used as a reactor vessel. One inch i.d. by ten inch long extensions were positioned at either end of this reactor vessel and terminated in ball joints which allowed quick disconnecting of the entire assembly, if desired, for example, for aqueous quenching of the catalyst after demetallization. Heat to the fluid bed reactor vessel was supplied by a Lindberg Model 54442-D furnace. Heat tracing of entry and exit gases was effected by external heat tape wrapping.

One pound of the above-noted catalyst was charged to this reactor vessel and fluidized with bottled air while heating to 1350 degrees F. When slumped the bed was ten inches high and when fluidized the bed was fourteen inches high. Approximately two hours were needed for heating to operating temperature, including a fifteen minute period when the gas lines and the fluid bed were flushed with nitrogen before introducing $H_2S$.

After this nitrogen flush, the catalyst bed was fluidized with 100% $H_2S$ for four hours. Following this sulfiding step, the reactor vessel and contents were cooled to 650 degrees F. under nitrogen fluidization. The catalyst bed was then fluidized with 100% chlorine gas for 90 minutes at 650 degrees F. Following the chlorination, the reactor was flushed with nitrogen for fifteen minutes while maintaining a temperature of about 650 degrees F. This nitrogen purge removed some chlorine from the void space in the catalyst bed and some volatile vanadium, and iron chlorine-containing components.

Half of the hot chlorinated catalyst was contacted with a liquid water wash. The other half of the chlorinated catalyst was cooled to ambient temperature, i.e., about 70 degrees F., before being contacted with about 900 ml. of a liquid water wash. In both instances, the catalyst/water slurries were filtered on Buchner funnels, washed with a three fold excess of water, reslurried at 4/1 water to catalyst ratio, refiltered, rewashed, and oven dried at 230 degrees F. overnight. Each of these catalyst samples included reduced amounts of metal, in particular vanadium and nickel, relative to the original, untreated catalyst.

The original, untreated catalyst, and the two demetallized catalysts were each tested for catalytic activity using the Micro Activity test (ASTM D 3907-80). Results of these tests were as follows.

| | EXAMPLE | | |
|---|---|---|---|
| | 1 | 2 | 3 |
| Component[1] | Original Untreated Catalyst[2] | Hot Washed Demetallized Catalyst | Cool Washed Demetallized Catalyst |
| MAT NUMBER | 55.3 | 58.5 | 61.2 |
| | Wt. % | Wt. % | Wt. % |
| Gas | 2.81 | 2.81 | 3.10 |
| Gasoline | 48.97 | 51.10 | 53.52 |
| Light Cycle Oil | 30.77 | 28.18 | 26.72 |
| Decant Oil | 13.90 | 13.36 | 12.11 |
| Coke | 3.56 | 4.56 | 4.54 |

[1]Component distillation cuts were: gas, to $C_4$; gasoline, $C_4$ to 421 degrees F.; light cycle oil, 421 degrees F. to 651 degrees F.; decant oil, 651 degrees F. plus.
[2]Average of two Micro Activity Tests These results clearly show that cooling a chlorinated zeolite-containing catalyst before initial water contacting/washing provides improved catalytic activity. For example, the MAT number and the yield of valuable gasoline are substantially increased in the ambient cooled catalyst relative to the original, untreated catalyst and the hot quenched demetallized catalyst.

EXAMPLES 4 TO 6

A second mass of commercial equibrium fluid catalytic cracking catalyst was obtained for testing. This catalyst was commercially manufactured and contained a catalytically effective amount of a combination of USY and rare earth metal exchanged Y synthetic zeolite. The catalyst had been used in a commercial fluid bed catalytic cracking operation and included amounts of vanadium, iron and nickel from the catalytic cracking hydrocarbon feedstock which became associated with the catalyst when the catalyst was in the cracking reaction zone.

One pound of this catalyst was treated in the reaction system described in Examples 1 to 3 by sulfidation and chlorination as described in Examples 1 to 3 except the sulfiding occurred for two hours and the chlorination for one hour.

Following the one hour chlorination, the reactor vessel was flushed with nitrogen for 15 minutes, the ball joint extensions were disconnected and the hot catalyst divided into two one-half pound portions. One portion of the hot catalyst was contacted with about 900 ml. of deionized water, while the other portion of the hot catalyst was contacted with about 900 ml. of an aqueous solution of ammonium chloride at pH equal to about 3.

Each of the slurries (resulting from the above-noted contactings) was filtered on Buchner funnels, washed with a three-fold excess of water, reslurried at a 4/1 water to catalyst ratio, refiltered, rewashed and oven dried at 230 degrees F. overnight. Each of these catalysts portions included reduced amounts of metal relative to the original, untreated catalyst.

The original, untreated catalyst, and the two demetallized catalysts were each tested for catalytic activity using the Micro Activity test (ASTM D 3907-80). Results of these tests were as follows.

| | EXAMPLE | | |
|---|---|---|---|
| | 4 | 5 | 6 |
| COMPONENT[1] | Original Untreated Catalyst | Washed With Ammonium Ion | Washed With Water |
| MAT Number | 61.7 | 60.8 | 66.4 |
| | Wt. % | Wt. % | Wt. % |
| Gas | 3.33 | 2.86 | 3.90 |
| Gasoline | 55.30 | 54.89 | 58.71 |
| Light Cycle Oil | 28.23 | 25.23 | 23.95 |
| Decant Oil | 10.05 | 14.01 | 9.68 |
| Coke | 3.09 | 3.01 | 3.75 |

[1]Component Cuts same as in Examples 1 to 3

The results clearly show that contacting/washing a chlorinated demetallized, zeolite-containing catalyst in the substantial absence of ammonium ion provides substantial benefits, e.g., increased MAT number and yield of valuable gasoline. This is particularly surprising since many of the prior patents on demetallizing non-zerolite-containing catalyst employ ammonium ion to neutralize the chlorinated catalyst.

EXAMPLES 7 AND 8

Catalysts demetallized in accordance with procedures described in Examples 3 and 6 are each subjected to a combination of reductive/oxidative washes.

The reductive wash is performed as follows. The demetallized catalyst is slurried with water to give about a 20 weight % of solids slurry and sufficient sulfur dioxide is added to give an initial pH of 2.0. The temperature of the slurry is maintained at about 70 degrees C. for about 3 minutes. The catalyst is then filtered and the aqueous sulfur dioxide wash is repeated twice more to give a total of three reductive washes. After an intermediate water wash, the demetallized, reductively washed catalysts from Example 3 and 6 are subjected to an oxidative wash with an aqueous solution of $H_2O_2$. This wash is performed for 3 minutes, at 70 degrees C. with a 20 weight % solids slurry utilizing $H_2O_2$ in an amount of 10 pounds per ton of catalyst. The catalysts are water washed, filtered and dried.

The demetallized catalysts from Examples 7 and 8, i.e., the reductively/oxidatively washed demetallized catalyst from Examples 3 and 6, respectively, have substantially improved catalytic activity relative to the original untreated catalysts.

EXAMPLES 9 TO 12

Catalysts demetallized in accordance with procedures described in Examples 3, 6, 7 and 8 are included in the circulating catalyst inventory of a commercial fluid bed catalytic cracking unit processing substantially hydrocarbon gas oil. Over a period of time, it is determined that all the catalysts perform satisfactorily in this commercial operation.

While this invention has been described with respect to various specific examples and embodiments, it is to be understood that the invention is not limited thereto and that it can be practiced within the scope of the following claims.

The embodiments of the present invention in which an exclusive property or privilege is claimed are as follows:

1. In a hydrocarbon cracking process employing a catalyst to promote the cracking of a substantially hydrocarbon feedstock, the improvement comprising employing a demetallized catalyst obtained from a catalyst demetallization process, said catalyst comprising at least one synthetic crystalline material capable of promoting said hydrocarbon cracking, said catalyst demetallization process including the steps of contacting a metal contaminated cracking catalyst with at least one chlorine-containing component to form a chlorinated catalyst and contacting said chlorinated catalyst with at least one aqueous liquid composition substantially free of ammonium ions to produce a demetallized catalyst having a reduced content of said contaminant metal, provided that said chlorinated catalyst is cooled by at least about 50° F. prior to the contacting of said chlorinated catalyst with said aqueous liquid composition substantially free of ammonium ions, thereby forming a demetallized catalyst with improved hydrocarbon cracking catalytic activity.

2. The process of claim 1 wherein said hydrocarbon cracking process further includes a regeneration step which includes contacting said catalyst with gaseous oxygen at elevated temperature sufficient to combust carbonaceous deposit material from said catalyst.

3. The process of claim 1 wherein said catalyst is contacted with at least one sulfur-containing component to form a sulfided catalyst prior to being contacted with said chlorine-containing component.

4. The process of claim 1 wherein said demetallized catalyst is further subjected to at least one reductive wash and at least one oxidative wash.

5. The process of claim 1 wherein said synthetic crystalline material comprises at least one zeolite, and said contaminant metal is selected from group consisting of vanadium, nickel, iron, copper and mixtures thereof.

6. In a hydrocarbon cracking process employing a catalyst to promote the cracking of a substantially hydrocarbon feedstock, the improvement comprising employing a demetallized catalyst in said hydrocarbon cracking process, said catalyst comprising at least one synthetic crystalline material capable of promoting said hydrocarbon cracking, said catalyst being obtained from a demetallization process including the steps of contacting a metal contaminated catalyst with at least one chlorine-containing component to form a chlorinated catalyst and contacting said chlorinated catalyst with at least one aqueous liquid composition substantially free of ammonium ions to produce a demetallized catalyst having a reduced content of said contaminant metal, improvement thereby forming a demetallized catalyst with improved hydrocarbon conversion catalytic activity.

7. The process of claim 6 wherein said hydrocarbon cracking process further includes a regeneration step which includes contacting said catalyst with gaseous oxygen at elevated temperature sufficient to combust carbonaceous deposit material from said catalyst.

8. The process of claim 6 wherein said catalyst is contacted with at least one sulfur-containing component to form a sulfided catalyst prior to being contacted with said chlorine-containing component.

9. The process of claim 8 wherein said hydrocarbon cracking process further includes contacting said catalyst with gaseous oxygen at elevated temperature sufficient to combust carbonaceous deposit material from said catalyst.

10. The process of claim 6 wherein said synthetic crystalline material comprises at least one zeolite, and said contaminant metal is selected from the group consisting of vanadium nickel, iron, copper and mixtures thereof.

11. The process of claim 6 wherein said chlorinated catalyst is cooled prior to the contacting of said chlorinated catalyst with said aqueous liquid composition.

* * * * *

UNITED STATES PATENT AND TRADEMARK OFFICE
CERTIFICATE OF CORRECTION

PATENT NO. : 4,787,968
DATED : November 29, 1988
INVENTOR(S) : Frank J. Elvin

It is certified that error appears in the above-identified patent and that said Letters Patent is hereby corrected as shown below:

Column 16, line 17; delete "improvement".

Signed and Sealed this

Sixth Day of June, 1989

Attest:

DONALD J. QUIGG

Attesting Officer

Commissioner of Patents and Trademarks